(12) United States Patent
Yeh et al.

(10) Patent No.: US 12,549,682 B2
(45) Date of Patent: Feb. 10, 2026

(54) SCREEN SHARING SYSTEM AND SCREEN SHARING METHOD FOR VIDEO CONFERENCE

(71) Applicant: Wistron Corporation, New Taipei (TW)

(72) Inventors: Shan-Hua Yeh, New Taipei (TW); Tao Chen, New Taipei (TW)

(73) Assignee: Wistron Corporation, New Taipei (TW)

(*) Notice: Subject to any disclaimer, the term of this patent is extended or adjusted under 35 U.S.C. 154(b) by 293 days.

(21) Appl. No.: 18/300,341

(22) Filed: Apr. 13, 2023

(65) Prior Publication Data

US 2024/0289081 A1 Aug. 29, 2024

(30) Foreign Application Priority Data

Feb. 27, 2023 (CN) .......................... 202310171546.2

(51) Int. Cl.
| | |
|---|---|
| *H04N 7/15* | (2006.01) |
| *G06F 3/14* | (2006.01) |
| *H04L 65/403* | (2022.01) |
| *H04N 7/14* | (2006.01) |
| *H04N 21/43* | (2011.01) |
| *H04N 21/41* | (2011.01) |

(52) U.S. Cl.
CPC ............ *H04N 7/15* (2013.01); *G06F 3/1454* (2013.01); *H04L 65/403* (2013.01); *H04N 7/147* (2013.01); *H04N 7/152* (2013.01); *H04N 21/43076* (2020.08); *H04N 7/157* (2013.01); *H04N 21/4122* (2013.01)

(58) Field of Classification Search
None
See application file for complete search history.

(56) References Cited

U.S. PATENT DOCUMENTS

| | | | |
|---|---|---|---|
| 2016/0274854 A1* | 9/2016 | Tokiwa | ................... H04L 67/02 |
| 2022/0253268 A1* | 8/2022 | Deole | ...................... G09G 5/12 |
| 2022/0272134 A1* | 8/2022 | Jain | ...................... H04L 65/4015 |
| 2022/0398062 A1* | 12/2022 | Li | ........................... G06F 3/165 |
| 2024/0303023 A1* | 9/2024 | Wänstedt | ............ H04L 65/1069 |

FOREIGN PATENT DOCUMENTS

| | | |
|---|---|---|
| CN | 103731405 | 4/2014 |
| CN | 111093088 | 5/2020 |

OTHER PUBLICATIONS

"Office Action of Taiwan Counterpart Application", issued on Sep. 13, 2023, p. 1-p. 13.

* cited by examiner

*Primary Examiner* — Quoc D Tran
(74) *Attorney, Agent, or Firm* — JCIPRNET

(57) ABSTRACT

A screen sharing system and a screen sharing method for a video conference are provided. The screen sharing method includes the following. An identifier is transmitted and video data matching the identifier is transmitted by a first terminal device. Status information corresponding to a second terminal device is received by the first terminal device in response to transmitting the video data. A prompt message is output by the first terminal device according to the status information. The first terminal device determines whether screen sharing with the second terminal device is successful according to the prompt message.

20 Claims, 2 Drawing Sheets

SCREEN SHARING SYSTEM AND SCREEN SHARING METHOD FOR VIDEO CONFERENCE

CROSS-REFERENCE TO RELATED APPLICATION

This application claims the priority benefit of China application serial no. 202310171546.2, filed on Feb. 27, 2023. The entirety of the above-mentioned patent application is hereby incorporated by reference herein and made a part of this specification.

BACKGROUND

Technical Field

The disclosure relates to wireless communication technology. Particularly, the disclosure relates to a screen sharing system and a screen sharing method for a video conference.

Description of Related Art

During a video conference, a moderator typically shares conference information with participants by utilizing screen sharing. After each time of screen sharing, the moderator is required to ask each participant by voice whether they successfully see the conference information shared by the moderator. When the number of participants is relatively large, the above process is relatively time-consuming.

SUMMARY

The disclosure provides a screen sharing system and a screen sharing method for a video conference, which assist a moderator of a video conference in checking a screen sharing status with each participant.

In an embodiment the disclosure, a screen sharing system for a video conference including a first terminal device. The first terminal device transmits an identifier and transmits video data matching the identifier. The first terminal device receives status information corresponding to a second terminal device in response to transmitting the video data. The first terminal device outputs a prompt message according to the status information. The first terminal device determines whether screen sharing with the second terminal device is successful according to the prompt message.

In an embodiment of the disclosure, the screen sharing system further includes the second terminal device. The second terminal device is communicatively connected to the first terminal device, and receive the identifier and the video data. The second terminal device determines whether the video data matches the identifier in response to receiving the video data. The second terminal device transmits a status code in response to determining that the video data matches the identifier. The status code indicates that the screen sharing with the second terminal device is successful.

In an embodiment of the disclosure, the second terminal device transmits the status code in response to not receiving the video data within a predetermined period after receiving the identifier. The status code indicates that the screen sharing with the second terminal device is not successful.

In an embodiment of the disclosure, the video data includes the identifier. The second terminal device determines whether the video data matches the identifier according to the identifier in the video data.

In an embodiment of the disclosure, the screen sharing system further includes the second terminal device. The second terminal device is communicatively connected to the first terminal device. The second terminal device receives the identifier and the video data. The second terminal device retrieves a display image output by the second terminal device in response to receiving the video data, and determines whether the display image matches the identifier. The second terminal device transmits a status code in response to determining that the display image matches the identifier. The status code indicates that the screen sharing with the second terminal device is successful.

In an embodiment of the disclosure, the video data includes a graphic corresponding to the identifier. The second terminal device determines that the display image matches the identifier in response to the display image including the graphic.

In an embodiment of the disclosure, the second terminal device determines that the display image does not match the identifier in response to the display image not including the graphic.

In an embodiment of the disclosure, the screen sharing system further includes a server. The server is communicatively connected to the first terminal device and the second terminal device. The server forwards the identifier and the video data from the first terminal device to the second terminal device.

In an embodiment of the disclosure, the server obtains a sharing list from the first terminal device and forwards the identifier and the video data to the second terminal device in response to the sharing list including the second terminal device.

In an embodiment of the disclosure, the screen sharing system further includes a server. The server is communicatively connected to the first terminal device and the second terminal device. The server transmits the status information including the status code to the first terminal device in response to receiving the status code from the second terminal device.

In an embodiment of the disclosure, a screen sharing method for a video conference including the following. An identifier is transmitted and video data matching the identifier is transmitted by a first terminal device. Status information corresponding to a second terminal device is received by the first terminal device in response to transmitting the video data. A prompt message is output by the first terminal device according to the status information. The first terminal device determines whether screen sharing with the second terminal device is successful according to the prompt message.

In an embodiment of the disclosure, the screen sharing method further includes the following. The identifier and the video data are received by the second terminal device. Whether the video data matches the identifier is determined by the second terminal device in response to receiving the video data. A status code is transmitted by the second terminal device in response to determining that the video data matches the identifier. The status code indicates that the screen sharing with the second terminal device is successful.

In an embodiment of the disclosure, the screen sharing method further includes the following. The status code is transmitted by the second terminal device in response to not receiving the video data within a predetermined period after receiving the identifier. The status code indicates that the screen sharing with the second terminal device is not successful.

In an embodiment of the disclosure, the video data includes the identifier. Determining whether the video data matches the identifier includes the following. Whether the video data matches the identifier is determined according to the identifier in the video data by the second terminal device.

In an embodiment of the disclosure, the screen sharing method further includes the following. The identifier and the video data are received by the second terminal device. By the second terminal device, a display image output by the second terminal device is retrieved in response to receiving the video data, and whether the display image matches the identifier is determined according to the display image. A status code is transmitted by the second terminal device in response to determining that the display image matches the identifier. The status code indicates that the screen sharing with the second terminal device is successful.

In an embodiment of the disclosure, the video data includes a graphic corresponding to the identifier. Determining whether the display image matches the identifier according to the display image includes the following. That the display image matches the identifier is determined by the second terminal device in response to the display image including the graphic.

In an embodiment of the disclosure, determining whether the display image matches the identifier according to the display image includes the following. That the display image does not match the identifier is determined by the second terminal device in response to the display image not including the graphic.

In an embodiment of the disclosure, the screen sharing method further includes the following. The identifier and the video data from the first terminal device are forwarded by a server to the second terminal device.

In an embodiment of the disclosure, forwarding the identifier and the video data from the first terminal device by the server to the second terminal device includes the following. By the server, a sharing list is obtained from the first terminal device and the identifier and the video data are forwarded to the second terminal device in response to the sharing list including the second terminal device.

In an embodiment of the disclosure, the screen sharing method further includes the following. The status information including the status code is transmitted to the first terminal device by a server in response to receiving the status code from the second terminal device.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
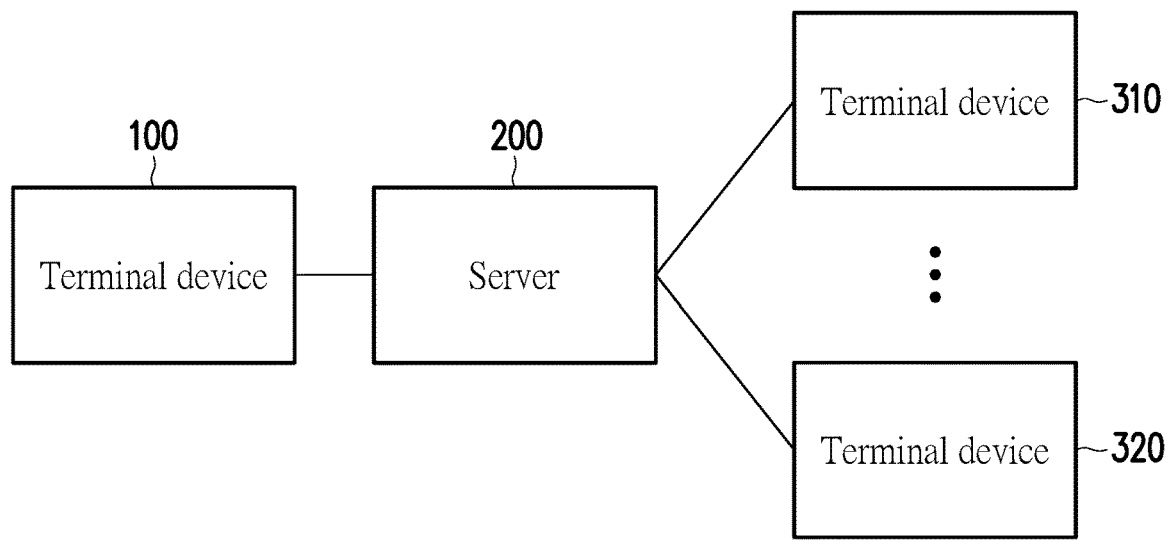
FIG. 1 is a schematic diagram of a screen sharing system for a video conference according to an embodiment of the disclosure.

To make the disclosure more comprehensible, embodiments are particularly provided below as examples according to which the disclosure can reliably be implemented. In addition, wherever possible, elements/components/steps using the same reference numerals in the drawings and embodiments denote the same or like parts.

FIG. 1 is a schematic diagram of a screen sharing system 10 for a video conference according to an embodiment of the disclosure. The screen sharing system 10 may include a terminal device 100 of a moderator (i.e., a person to share a screen) of a video conference, a server 200, and terminal devices of N participants, where N may be any positive integer. The terminal devices of the N participants include a terminal device 310 and a terminal device 320, for example. The server 200 may be communicatively connected to the terminal device 100, the terminal device 310, and the terminal device 320. The terminal device 100 may be communicatively connected to the terminal device 310 or the terminal device 320 through the server 200.

The terminal device 100 (or the server 200, the terminal device 310, or the terminal device 320) includes essential elements such as a processing unit (for example but not limited to a processor), a communication unit (for example but not limited to various communication chips, mobile communication chips, Bluetooth chips, or WiFi chips), and a storage unit (for example but not limited to removable random access memory, flash memory, or a hard disk drive) for running the terminal device 100 (or the server 200, the terminal device 310, or the terminal device 320). In an embodiment, the terminal device 100 (or the terminal device 310 or the terminal device 320) may further include input/output devices such as a display, a speaker, or a keyboard. The terminal device 100, the terminal device 310, or the terminal device 320 may include but is not limited to a personal computer, a notebook computer, a tablet computer, or a smart phone.

Figure 2:
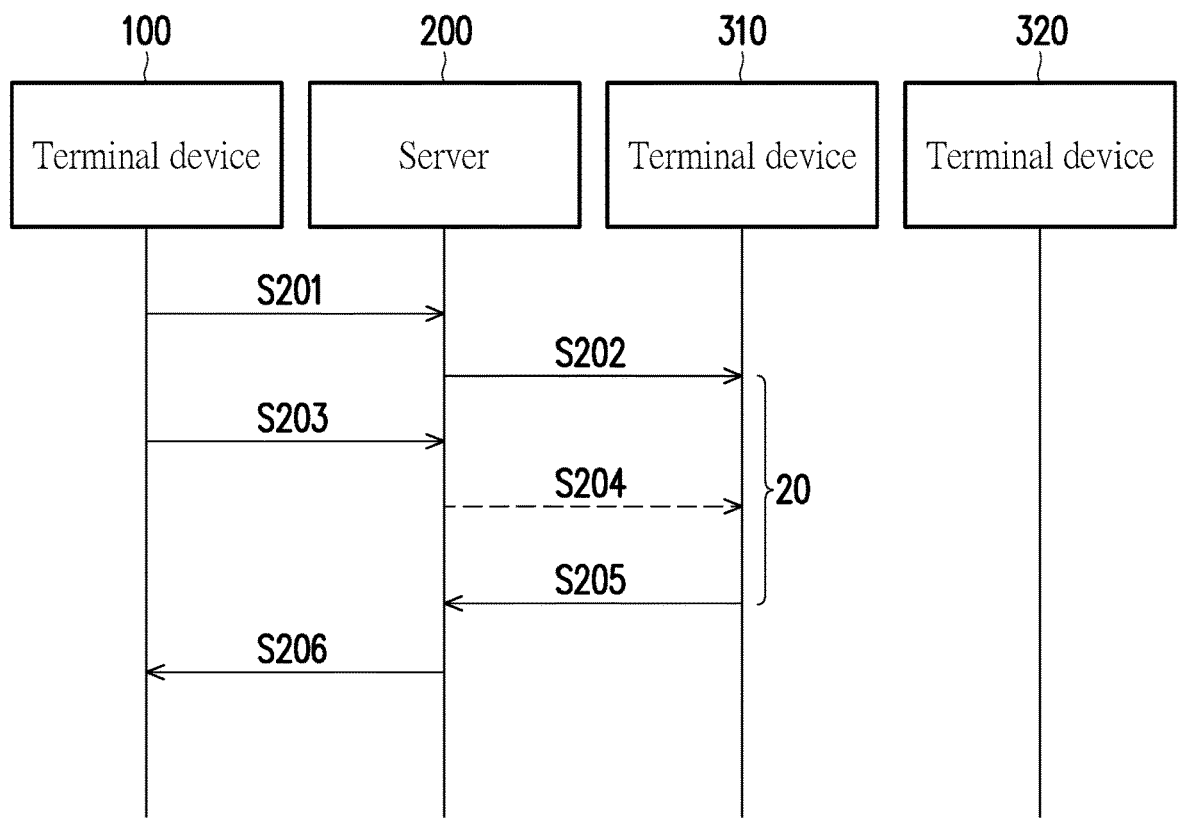
FIG. 2 is a signaling diagram of a screen sharing method according to an embodiment of the disclosure.

FIG. 2 is a signaling diagram of a screen sharing method according to an embodiment of the disclosure. The screen sharing method may be implemented by the screen sharing system 10 shown in FIG. 1.

In step S201, the terminal device 100 transmits an identifier corresponding to the terminal device 100 to the server 200. In step S202, the server 200 forwards the identifier from the terminal device 100 to the terminal device 310.

Specifically, the moderator of a video conference may decide to share a display image of the terminal device 100 with a specific terminal device. The moderator may operate the terminal device 100 to transmit a sharing list including a specific terminal device identifier to the server 200. The server 200 transmits the specific terminal device identifier from the terminal device 100 to the specific terminal device matching the sharing list. Comparatively, terminal devices not matching the sharing list do not receive any identifier. For example, it is assumed that the moderator decides to share the display image of the terminal device 100 with the terminal device 310 but not the terminal device 320. The moderator may operate the terminal device 100 to transmit information including the identifier of the terminal device 310 but not the identifier of the terminal device 320 to the server 200. In an embodiment, the server 200 further integrates the received information (one or more identifiers) into the sharing list. In other words, the server 200 obtains the sharing list according to the information from the terminal device 100. After receiving the identifier from the terminal device 100, the server 200 may forward the identifier of the terminal device 310 to the terminal device 310 in response to the terminal device 310 matching the sharing list, which means that the terminal device 310 matches the sharing list, that is, the terminal device 310 is to share the display image with the terminal device 310. Since the identifier of the terminal device 320 does not match the content in the sharing list (i.e., the identifier of the terminal device 320 does not appear in the sharing list), the server 200 does not transmit the identifier to the terminal device 320.

In step S203, the terminal device 100 may transmit video data matching the identifier to the server 200. In step S204, the server 200 may forward the video data to the terminal device 310.

Specifically, the video data may include the identifier or a graphic corresponding to the identifier (e.g., a watermark or a quick response (QR) code). After the server 200 receives the video data from the terminal device 100, the server 200 may forward the video data to the terminal device 310 matching the sharing list.

In an embodiment, after the terminal device 310 receives the video data from the server 200, the terminal device 310 may determine whether the video data matches the identifier of the terminal device 310. Specifically, the terminal device 310 may determine whether the video data includes the identifier of the terminal device 310. If the video data includes the identifier of the terminal device 310, the terminal device 310 may determine that the video data matches the identifier of the terminal device 310, and then generate a status code of the terminal device 310 indicating that the screen sharing is successful. If the video data does not include the identifier of the terminal device 310, the terminal device 310 may determine that the video data does not match the identifier of the terminal device 310, and then generate the status code of the terminal device 310 indicating that the screen sharing is not successful.

In an embodiment, in response to not receiving the video data within a predetermined period 20 of receiving the identifier of the terminal device 310, the terminal device 310 may generate the status code of the terminal device 310 indicating that the screen sharing is not successful. In other words, if step S204 is not performed within the predetermined period 20 after step S202, the terminal device 310 may determine that the screen sharing has failed, and generate the status code of the terminal device 310 indicating that the screen sharing is not successful.

In an embodiment, after the terminal device 310 receives the video data from the server 200, the terminal device 310 may retrieve the display image being displayed by the terminal device 310, and determine whether the display image matches the identifier of the terminal device 310.

Figure 3:
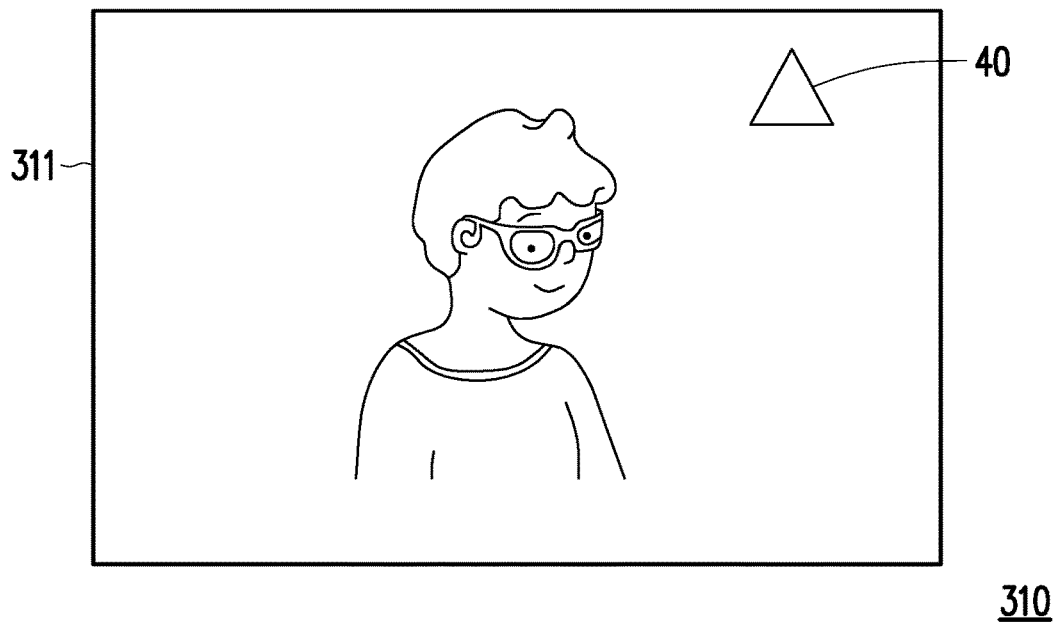
FIG. 3 is a schematic diagram of a display image of a terminal device according to an embodiment of the disclosure.

FIG. 3 is a schematic diagram of a display image 311 of a terminal device 310 according to an embodiment of the disclosure. Specifically, the video data may include a graphic 40 corresponding to the identifier. The graphic 40 is a watermark or a QR code, for example. If the display image 311 output by the terminal device 310 includes the graphic 40, it means that the terminal device 310 has received the correct video data and successfully displayed the display image 311 corresponding to the video data. Accordingly, the terminal device 310 may determine that the display image 311 matches the identifier of the terminal device 310, and then generate the status code of the terminal device 310 indicating that the screen sharing is successful. Comparatively, if the display image 311 output by the terminal device 310 does not include the graphic 40, it means that the terminal device 310 has not received the correct video data or the terminal device 310 has not successfully displayed the display image 311 corresponding to the correct video data. Accordingly, the terminal device 310 may determine that the display image 311 does not match the identifier of the terminal device 310, and then generate the status code of the terminal device 310 indicating that the screen sharing is not successful.

Returning to FIG. 2, in step S205, the terminal device 310 may transmit the status code of the terminal device 310 to the server 200. The status code indicates whether the screen sharing with the terminal device 310 is successful. In step S206, in response to receiving the status code of the terminal device 310, the terminal device 310 may transmit status information including the status code of the terminal device 310 to the terminal device 100.

After receiving the status information from the server 200, the terminal device 100 may output a prompt message according to the status information. The prompt message is used to indicate whether the screen sharing with the terminal device 310 is successful. For example, the terminal device 100 may display the prompt message through the monitor for the moderator to see. The moderator may utilize the prompt message to determine that the screen sharing with the terminal device 310 is successful without asking the participants about the screen sharing status of the terminal device 310.

Figure 4:
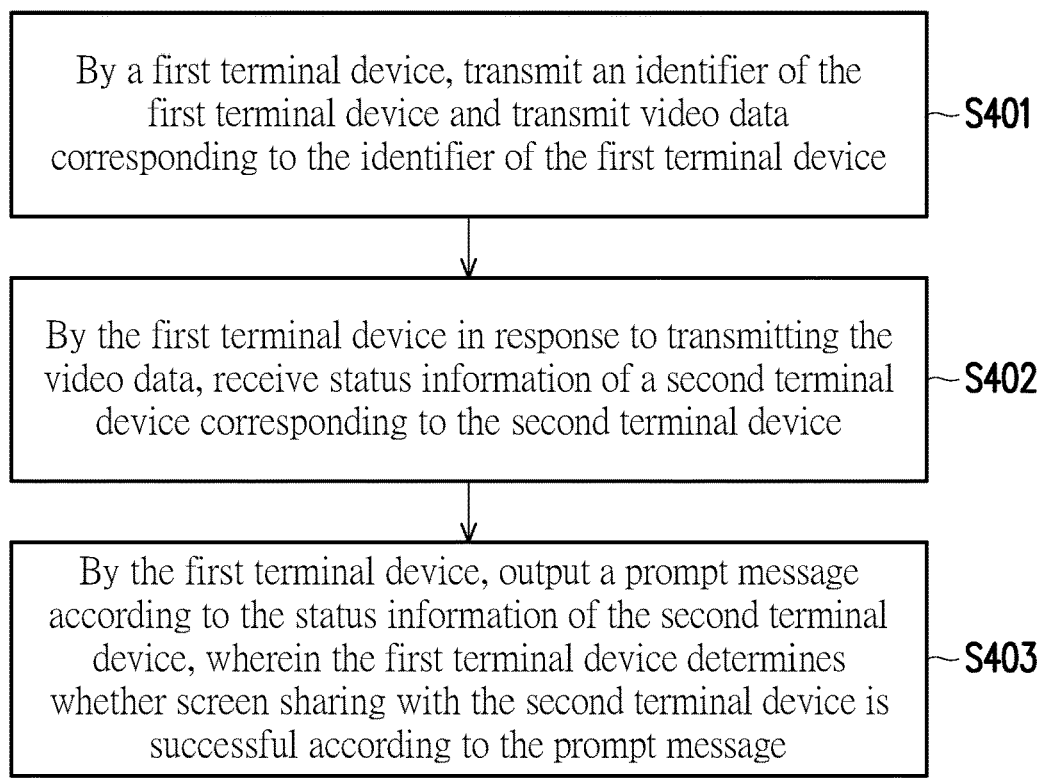
FIG. 4 is a flowchart of a screen sharing method for a video conference according to an embodiment of the disclosure.

FIG. 4 is a flowchart of a screen sharing method for a video conference according to an embodiment of the disclosure. The screen sharing method may be implemented by the screen sharing system 10 shown in FIG. 1. In step S401, an identifier of a first terminal device is transmitted and video data matching the identifier of the first terminal device is transmitted by the first terminal device. In step S402, status information of a second terminal device corresponding to the second terminal device is received by the first terminal device in response to transmitting the video data. In step S403, a prompt message is output by the first terminal device according to the status information of the second terminal device, and the first terminal device determines whether screen sharing with the second terminal device is successful according to indication of the prompt message.

In summary of the foregoing, the screen sharing system of the embodiment of the disclosure may embed the corresponding identifier in the video data shared by the terminal device of the moderator, and transmit the identifier to the terminal device of each participant with screen sharing permission. The terminal device of the moderator may transmit the video data corresponding to the identifier. After the terminal device of the participant receives the video data, the terminal device may retrieve the output display image and determine whether the display image matches the identifier. If the display image matches the identifier, it means that the image shared by the moderator has been successfully displayed on the terminal device of the participant. The terminal device of the participant may return the status code to prompt the moderator that the screen sharing is successful. The moderator can know whether the screen sharing is successful without confirming with the participants one by one. Accordingly, the embodiments of the disclosure save an amount of time for a video conference.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A screen sharing system for a video conference, comprising:
   a first terminal device, configured to transmit an identifier and transmit video data matching the identifier, wherein
   the first terminal device receives status information corresponding to a second terminal device in response to transmitting the video data, wherein
   the first terminal device outputs a prompt message according to the status information, wherein the first terminal device determines whether screen sharing with the second terminal device is successful according to the prompt message,
   wherein the second terminal device communicatively connected to the first terminal device, wherein the second terminal device receives the identifier and the video data,
   wherein the second terminal device retrieves a display image being displayed by the second terminal device in response to receiving the video data, and determines whether the display image matches the identifier in response to receiving the video data,
   wherein the display image being displayed by the second terminal device corresponds to the video data,
   wherein the video data comprises a graphic corresponding to the identifier, and the graphic is superimposed on the display image being displayed by the second terminal device.

2. The screen sharing system according to claim 1, wherein the second terminal device transmits a status code in response to determining that the video data matches the identifier, wherein the status code indicates that the screen sharing with the second terminal device is successful.

3. The screen sharing system according to claim 2, wherein
   the second terminal device transmits the status code in response to not receiving the video data within a predetermined period after receiving the identifier, wherein the status code indicates that the screen sharing with the second terminal device is not successful.

4. The screen sharing system according to claim 2, wherein the video data comprises the identifier, wherein
   the second terminal device determines whether the video data matches the identifier according to the identifier in the video data.

5. The screen sharing system according to claim 1, wherein
   the second terminal device transmits a status code to the first terminal device in response to determining that the display image matches the identifier, wherein the status code indicates that the screen sharing with the second terminal device is successful.

6. The screen sharing system according to claim 5, wherein
   the second terminal device determines that the display image matches the identifier, and generates the status code in response to the display image comprising the graphic.

7. The screen sharing system according to claim 6, wherein
   the second terminal device determines that the display image does not match the identifier in response to the display image not comprising the graphic.

8. The screen sharing system according to claim 1, further comprising:
   a server, communicatively connected to the first terminal device and the second terminal device, wherein
   the server forwards the identifier and the video data from the first terminal device to the second terminal device.

9. The screen sharing system according to claim 8, wherein
   the server obtains a sharing list from the first terminal device and forwards the identifier and the video data to the second terminal device in response to the sharing list comprising the second terminal device.

10. The screen sharing system according to claim 2, further comprising:
    a server, communicatively connected to the first terminal device and the second terminal device, wherein
    the server transmits the status information comprising the status code to the first terminal device in response to receiving the status code from the second terminal device.

11. A screen sharing method for a video conference, comprising:
    transmitting an identifier and transmitting video data matching the identifier by a first terminal device;
    receiving status information corresponding to a second terminal device by the first terminal device in response to transmitting the video data;
    outputting a prompt message by the first terminal device according to the status information, wherein the first terminal device determines whether screen sharing with the second terminal device is successful according to the prompt message,
    receiving the identifier and the video data by the second terminal device;
    by the second terminal device, retrieving a display image being displayed by the second terminal device in response to receiving the video data; and
    determining whether the display image matches the identifier by the second terminal device in response to receiving the video data,
    wherein the display image being displayed by the second terminal device corresponds to the video data,
    wherein the video data comprises a graphic corresponding to the identifier, and the graphic is superimposed on the display image being displayed by the second terminal device.

12. The screen sharing method according to claim 11, further comprising:
    transmitting a status code by the second terminal device in response to determining that the video data matches the identifier, wherein the status code indicates that the screen sharing with the second terminal device is successful.

13. The screen sharing method according to claim 12, further comprising:
    transmitting the status code by the second terminal device in response to not receiving the video data within a predetermined period after receiving the identifier, wherein the status code indicates that the screen sharing with the second terminal device is not successful.

14. The screen sharing method according to claim 12, wherein the video data comprises the identifier, wherein determining whether the video data matches the identifier comprises:
    determining whether the video data matches the identifier according to the identifier in the video data by the second terminal device.

15. The screen sharing method according to claim 11, further comprising:

transmitting a status code to the first terminal device by the second terminal device in response to determining that the display image matches the identifier, wherein the status code indicates that the screen sharing with the second terminal device is successful.

16. The screen sharing method according to claim 15, wherein determining whether the display image matches the identifier according to the display image comprises:

determining that the display image matches the identifier, and generating the status code by the second terminal device in response to the display image comprising the graphic.

17. The screen sharing method according to claim 16, wherein determining whether the display image matches the identifier according to the display image comprises:

determining that the display image does not match the identifier by the second terminal device in response to the display image not comprising the graphic.

18. The screen sharing method according to claim 11, further comprising:

forwarding the identifier and the video data from the first terminal device by a server to the second terminal device.

19. The screen sharing method according to claim 18, wherein forwarding the identifier and the video data from the first terminal device by the server to the second terminal device comprises:

by the server, obtaining a sharing list from the first terminal device and forwarding the identifier and the video data to the second terminal device in response to the sharing list comprising the second terminal device.

20. The screen sharing method according to claim 12, further comprising:

transmitting the status information comprising the status code to the first terminal device by a server in response to receiving the status code from the second terminal device.

\* \* \* \* \*